(12) United States Patent
Nishina

(10) Patent No.: US 9,644,592 B2
(45) Date of Patent: May 9, 2017

(54) IDLING STOP DEVICE

(71) Applicant: FUJI JUKOGYO KABUSHIKI KAISHA, Tokyo (JP)

(72) Inventor: Hirotake Nishina, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 464 days.

(21) Appl. No.: 13/734,686

(22) Filed: Jan. 4, 2013

(65) Prior Publication Data

US 2013/0180500 A1 Jul. 18, 2013

(30) Foreign Application Priority Data

Jan. 6, 2012 (JP) .................. 2012-001338

(51) Int. Cl.
*F02N 11/08* (2006.01)
*F02D 28/00* (2006.01)
*B60W 50/08* (2012.01)
*B60W 30/17* (2012.01)
*B60W 30/18* (2012.01)
*B60W 30/182* (2012.01)

(52) U.S. Cl.
CPC ......... *F02N 11/0837* (2013.01); *B60W 30/17* (2013.01); *B60W 30/182* (2013.01); *B60W 30/18018* (2013.01); *B60W 50/082* (2013.01); *F02D 28/00* (2013.01); *F02N 11/0822* (2013.01); *B60W 2510/305* (2013.01); *B60W 2520/10* (2013.01); *B60W 2540/12* (2013.01); *B60W 2550/22* (2013.01); *B60W 2550/306* (2013.01); *F02N 2200/0801* (2013.01); *F02N 2200/102* (2013.01); *F02N 2200/125* (2013.01); *Y02T 10/48* (2013.01)

(58) Field of Classification Search
CPC ......... B60W 2550/20; B60W 2550/22; B60W 2550/30; B60W 2550/302–2550/308; B60W 2540/12; B60W 30/18018; F02N 11/0822; F02N 11/0837; F02D 41/042
USPC .................. 701/112, 117–119; 180/285
See application file for complete search history.

(56) References Cited

U.S. PATENT DOCUMENTS

| | | | | |
|---|---|---|---|---|
| 5,451,820 | A * | 9/1995 | Gotoh et al. | 307/10.6 |
| 6,629,515 | B1 * | 10/2003 | Yamamoto et al. | 123/179.4 |
| 6,873,911 | B2 * | 3/2005 | Nishira | B60T 7/16 340/436 |
| 7,099,768 | B2 * | 8/2006 | Moriya | 701/112 |

(Continued)

FOREIGN PATENT DOCUMENTS

JP 2010-230160 A 10/2010

*Primary Examiner* — Erick Solis
*Assistant Examiner* — Robert Werner
(74) *Attorney, Agent, or Firm* — McDermott Will & Emery LLP

(57) ABSTRACT

There is provided an idling stop device. An ECU sets a lighting color index by recognizing a lighting color of a traffic light in front of a vehicle based upon external environment captured by an onboard camera, sets a distance index based upon a distance between the traffic light and a vehicle just in front of the vehicle, and sets a brake index based upon whether a brake lamp of the vehicle just in front of the vehicle is turned on or not. The ECU adds up these indices to obtain an ISS general index, sets a basic ISS speed based upon the ISS general index, and sets an ISS start speed based upon the basic ISS speed and a mode-based coefficient set based upon an engine mode.

6 Claims, 9 Drawing Sheets

(56) References Cited

U.S. PATENT DOCUMENTS

| | | | |
|---|---|---|---|
| 7,426,435 B2 * | 9/2008 | Gauthier et al. | 701/112 |
| 8,296,030 B2 * | 10/2012 | Luo | F02N 11/0837 |
| | | | 701/112 |
| 8,306,725 B2 * | 11/2012 | Son et al. | 701/123 |
| 8,515,615 B2 * | 8/2013 | Taguchi | 701/31.4 |
| 8,793,060 B2 * | 7/2014 | Takeuchi | F02N 11/0814 |
| | | | 123/179.4 |
| 9,069,653 B2 * | 6/2015 | Be | G06F 17/00 |
| 2006/0142121 A1 * | 6/2006 | Moriya | 477/199 |
| 2007/0112494 A1 * | 5/2007 | Naik | B60K 31/0008 |
| | | | 701/55 |
| 2007/0222638 A1 * | 9/2007 | Chen et al. | 340/901 |
| 2012/0029730 A1 * | 2/2012 | Nagura et al. | 701/2 |
| 2012/0179357 A1 * | 7/2012 | Phillips | 701/112 |
| 2012/0226433 A1 * | 9/2012 | Hasan et al. | 701/112 |

\* cited by examiner

FIG. 9A

| BRAKE PEDAL FORCE FB | INDEX PF |
|---|---|
| FB ≥ FBH (HIGH) | 20 |
| FBH > FB ≥ FBM (MIDDLE) | 10 |
| FBM > FB > 0 (LOW) | 0 |
| 0 ≥ FB | −50 |

FIG. 9B

| LIGHTING COLOR C | INDEX PC |
|---|---|
| CE (NON-RECOGNIZED) | 0 |
| CB (BLUE) | 0 |
| CY (YELLOW) | 50 |
| CR (RED) | 20 |

FIG. 9C

| DISTANCE LS | INDEX PLS |
|---|---|
| LS = LE (NON-RECOGNIZED) | 0 |
| LS ≤ LSS (SHORT) | 0 |
| LSS < LS ≤ LSM (SHORT MIDDLE) | 10 |
| LSM < LS ≤ LSL (MIDDLE) | 20 |
| LSL < LS (LONG) | 30 |

IDLING STOP DEVICE

CROSS-REFERENCE TO RELATED APPLICATIONS

The present application claims priority from Japanese Patent Application No. 2012-001338 filed on Jan. 6, 2012, the entire contents of which are hereby incorporated by reference.

BACKGROUND OF THE INVENTION

1. Field of the Invention

The present invention relates to an idling stop device that sets a vehicle speed optimum for starting an idling stop based upon external environment recognized by an external environment recognition unit.

2. Description of Related Art

Conventionally, the idling stop device of this type stops an engine after an elapse of a predetermined time after a driver completely stops a vehicle (0 [Km/h]) in consideration of change of mind (in re-acceleration just before or just after a driver stops the vehicle).

However, there has recently been known a technique of determining an idling stop condition (determining whether or not a brake pedal is depressed, and a vehicle speed is not more than a vehicle speed of starting an idling stop (20 [Km/h])), and when this condition is satisfied, an engine is stopped before the vehicle completely stops, as described in Japanese Unexamined Patent Application Publication No. 2010-230160.

The technique described in this publication stops the engine before the vehicle stops, thereby enhancing fuel economy.

In the technique described in the above-mentioned publication, the vehicle speed for starting the idling stop is uniformly set. However, there may be the case in which it would be better not to stop the engine depending upon external environment, even when the idling stop condition described above is satisfied For example, when a lighting color of a traffic light is changed from red to blue during deceleration before the vehicle stops, a driver depresses an accelerator pedal to again speed up the vehicle. If the idling stop condition is satisfied during the deceleration, the engine is uniformly stopped (idling stop), so that there is a delay in the re-acceleration, which might provide a feeling of strangeness to the driver.

When a line of cars waiting at stoplights is relatively long, a preceding vehicle does not start immediately even when the traffic light ahead is changed from red to blue, and therefore, the engine can be stopped (idling stop) relatively early.

As described above, the vehicle speed for starting the idling stop by the idling stop device is varied according to the external environment. In the technique described above, the idling stop condition is uniformly determined, so that the optimum idling stop timing cannot be obtained, resulting in that it is difficult to realize satisfactory fuel economy and drivability.

BRIEF SUMMARY OF THE INVENTION

The present invention is accomplished in view of the above-mentioned circumstance, and aims to provide an idling stop device that can set an optimum idling stop timing, thereby being capable of enhancing fuel economy and drivability.

A first aspect of the present invention provides an idling stop device including: an external environment recognition unit for recognizing external environment of a vehicle; an idling-stop start speed setting unit for setting a vehicle speed of starting an idling stop based upon the external environment recognized by the external environment recognition unit; and an idling stop controller for stopping an engine when the speed of the vehicle is reduced to a speed lower than the idling-stop start speed set by the idling-stop start speed setting unit.

The present invention sets the idling-stop start speed based upon the external environment recognized by the external environment recognition unit, thereby being capable of setting an optimum idling stop timing, and therefore, the present invention can enhance both the fuel economy and drivability.

BRIEF DESCRIPTION OF THE SEVERAL VIEWS OF THE DRAWINGS

FIG. 9A is a table illustrating an index of brake pedal force; FIG. 9B is a table illustrating a lighting color index; and FIG. 9C is a table illustrating a distance index;

DETAILED DESCRIPTION OF THE INVENTION

Figure 1:
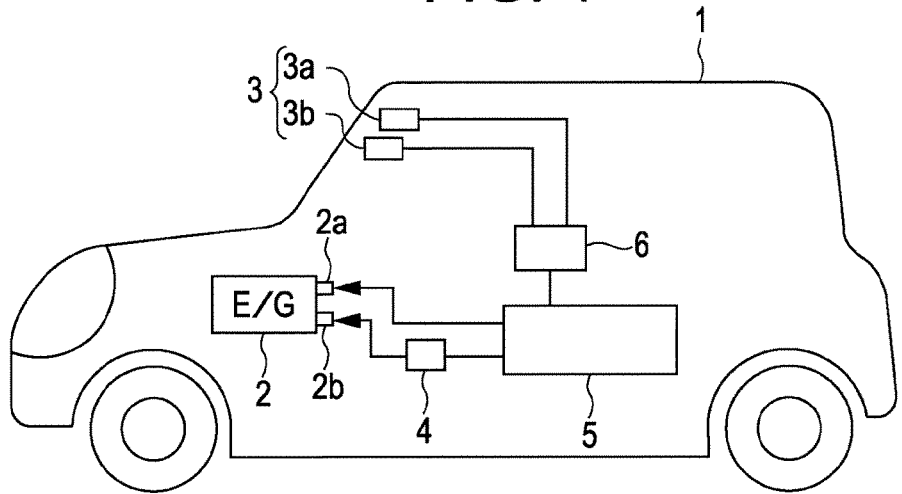
FIG. 1 is a schematic view of a vehicle including an idling stop device.

An embodiment of the present invention will be explained in detail below with reference to the drawings. A vehicle 1 in FIG. 1 is an automobile or the like and includes an engine 2 and an onboard camera 3. An injector 2a and an ignition plug 2b are mounted to each cylinder in the engine 2, and each ignition plug 2b is connected to an igniter 4.

The onboard camera 3 is one example of an external environment recognition unit. In the present embodiment, a stereo camera including a main camera 3a and a sub-camera 3b is employed. The onboard camera 3 is disposed on each side of a rearview mirror (not illustrated) on an upper central part of a front window in order to shoot environment (external environment) in front of the vehicle 1.

The vehicle 1 also has an engine control unit (ECU) 5 for controlling the engine 2. The ECU 5 outputs a fuel injection signal to the injector 2a so as to inject fuel by a predetermined calculated amount to a cylinder of interest on a predetermined timing, and outputs an ignition signal to the igniter 4 on a predetermined timing so as to allow the ignition plug 2b mounted to the cylinder to be ignited, thereby causing a spark discharge by the igniter 4 for igniting air-fuel mixture in the cylinder.

Figure 2:
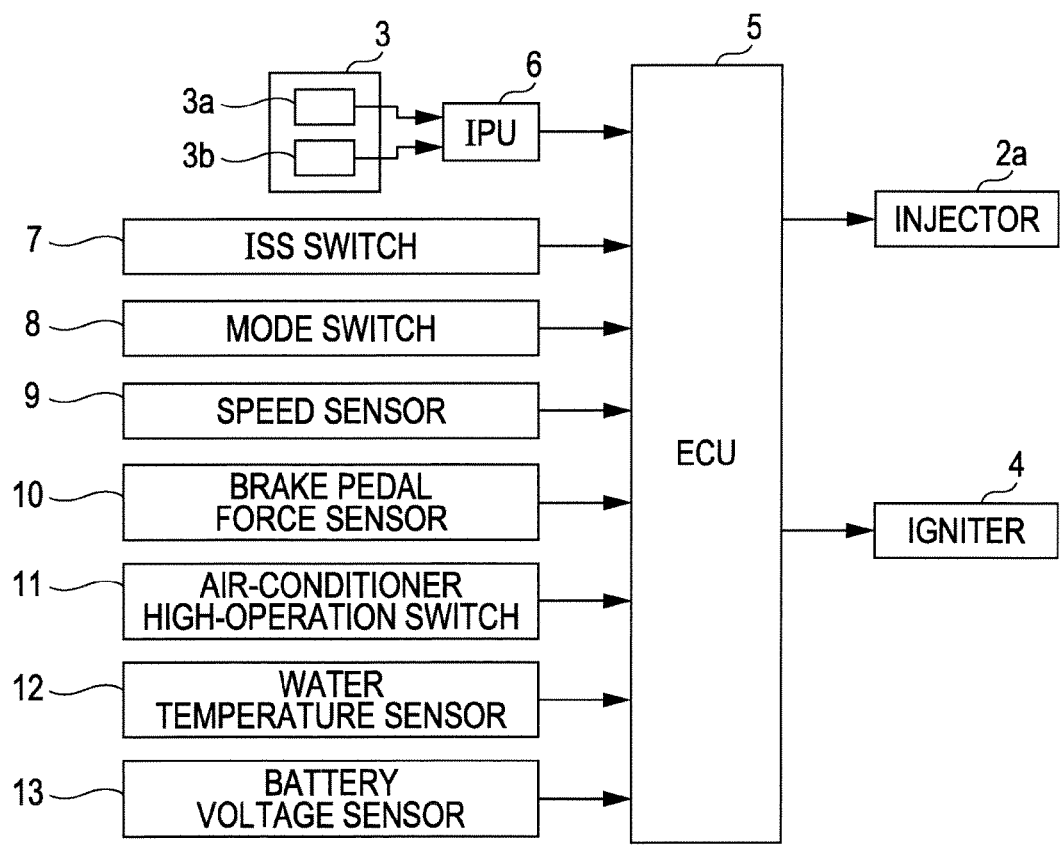
FIG. 2 is a view illustrating a configuration of the idling stop device.

The ECU 5 includes an idling stop control function. As illustrated in FIG. 2, the ECU 5 has, on its input side, various sensors and switches for detecting parameters required to execute an idling stop control, and an image processing unit (IPU) 6 for processing an image signal from the above-mentioned onboard camera 3 in a predetermined manner.

The sensors and switches include: an idling stop (ISS) switch 7 that is turned ON when a driver selects the idling stop control; a switch (mode switch) 8 for selecting an operation mode of the engine 2; a speed sensor 9 for detecting a vehicle speed V; a brake pedal force sensor 10 serving as a brake pedal force detecting unit for detecting force on a brake pedal; an air-conditioner high-operation switch (hereinafter referred to as "air-conditioner switch") 11 that detects a refrigerant pressure of an air conditioner, and is turned ON when the air conditioner reaches a predetermined high-pressure state; a water temperature sensor 12 for detecting a cooling water temperature Tw; a battery voltage sensor 13 for detecting a terminal voltage Vb of a battery. The mode switch 8 is operated by the driver to select a mode (engine mode) ME of the engine 2 according to the driver's favor. In the present embodiment, the vehicle 1 has three modes as the engine mode ME: a normal mode S, an echo-mode I, and a power mode S#. Examples of the mode switch 8 include a dial switch and a triple switch.

The normal mode S has an output characteristic in which the relationship between a pressure amount on the accelerator pedal and a target torque is set optimal for normal driving. The echo-mode I has the output characteristic suitable for economical driving in which the upper limit of the target torque on the low-speed side is suppressed, compared to the normal mode S. On the other hand, the power mode S# has an output characteristic having a relationship between the pressure on the accelerator pedal and the target torque such that the potential of the engine 2 can be exhibited to the full in almost all driving ranges. These modes may be set by changing a shift change characteristic of an automatic transmission.

The ECU 5 described above executes an idling stop (ISS) control based upon signals from the onboard camera 3 and various sensors and switches. Specifically, the ECU 5 firstly checks an ISS permitting condition. When the ECU 5 determines that the ISS permitting condition is satisfied, the ECU 5 sets an ISS general index PT according to the driving condition, and sets an ISS start speed VS corresponding to the ISS general index PT and the engine mode ME. When the vehicle speed V reaches the ISS start speed VS, the ECU 5 outputs a fuel cut signal to the injector 2a of the engine 2, and outputs an ignition cut signal to the igniter 4, thereby stopping the engine 2.

Figure 3:
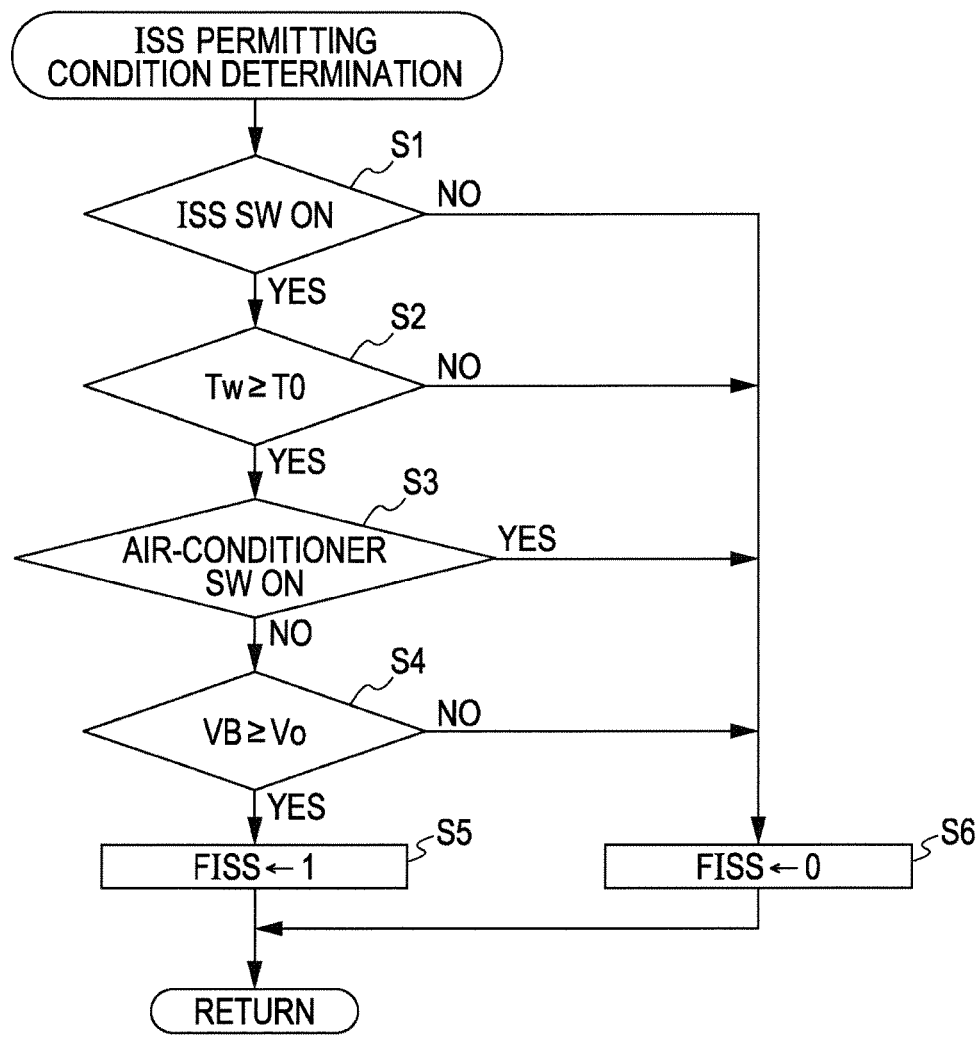
FIG. 3 is a flowchart illustrating an idling-stop permitting condition determining routine.

The ISS control executed by the ECU 5 is specifically processed according to flowcharts illustrated in FIGS. 3 to 8. When the ignition switch is turned ON, an ISS permitting condition determining routine illustrated in FIG. 3 is firstly started in every predetermined operation period. This routine determines whether or not the ISS control should be executed, based upon the conditions of the engine 2 and the battery. In step S1, the ECU 5 determines whether or not the ISS switch 7 is turned ON. If it is turned ON, the ECU 5 proceeds to step S2, and determines the permitting condition in steps S2 to S4. On the other hand, when the ISS switch 7 is turned OFF, the ECU 5 proceeds to step S6.

In the present embodiment, the cooling water temperature Tw, the air-conditioner switch 11, and the battery terminal voltage VB are checked as the ISS permitting condition, and when all conditions are satisfied, the ISS control is permitted. Specifically, in step S2, the ECU 5 checks whether or not the cooling water temperature Tw reaches a warm-up completion temperature To. In the case of Tw≥To, the ECU 5 determines that the warm-up is completed, and then, proceeds to step S3. In the case of Tw<To, the ECU 5 determines that the warm-up has not been completed, and then, proceeds to step S6. In step S3, the ECU 5 checks whether or not the air-conditioner switch 11 is turned ON. If air-conditioner switch 11 is turned OFF, the ECU 5 determines that the refrigerant pressure of the air conditioner is low, and then, proceeds to step S4. If air-conditioner switch 11 is turned ON, the ECU 5 determines that a load is generated because of the high refrigerant pressure of the air conditioner, and then, proceeds to step S6.

When proceeding to step S5, the ECU 5 determines that the ISS control condition is established, and thus sets an ISS permitting condition determination flag FISS (FISS←1), and exits the routine. On the other hand, when proceeding to step S6, the ECU 5 determines that the ISS control condition is not satisfied, and thus the ECU 5 clears the ISS permitting condition determining flag FISS (FISS←0), and exits the routine. The parameters for determining whether the ISS control is permitted or not are only illustrative, and other factors, such as an accelerator pedal opening degree, may be added. In this case, when the accelerator pedal is depressed, it may be determined that the ISS permitting condition is not satisfied. The initial value of the ISS permitting condition determining flag FISS is 0, and it is initialized every time the ignition switch is turned ON.

Figure 4:
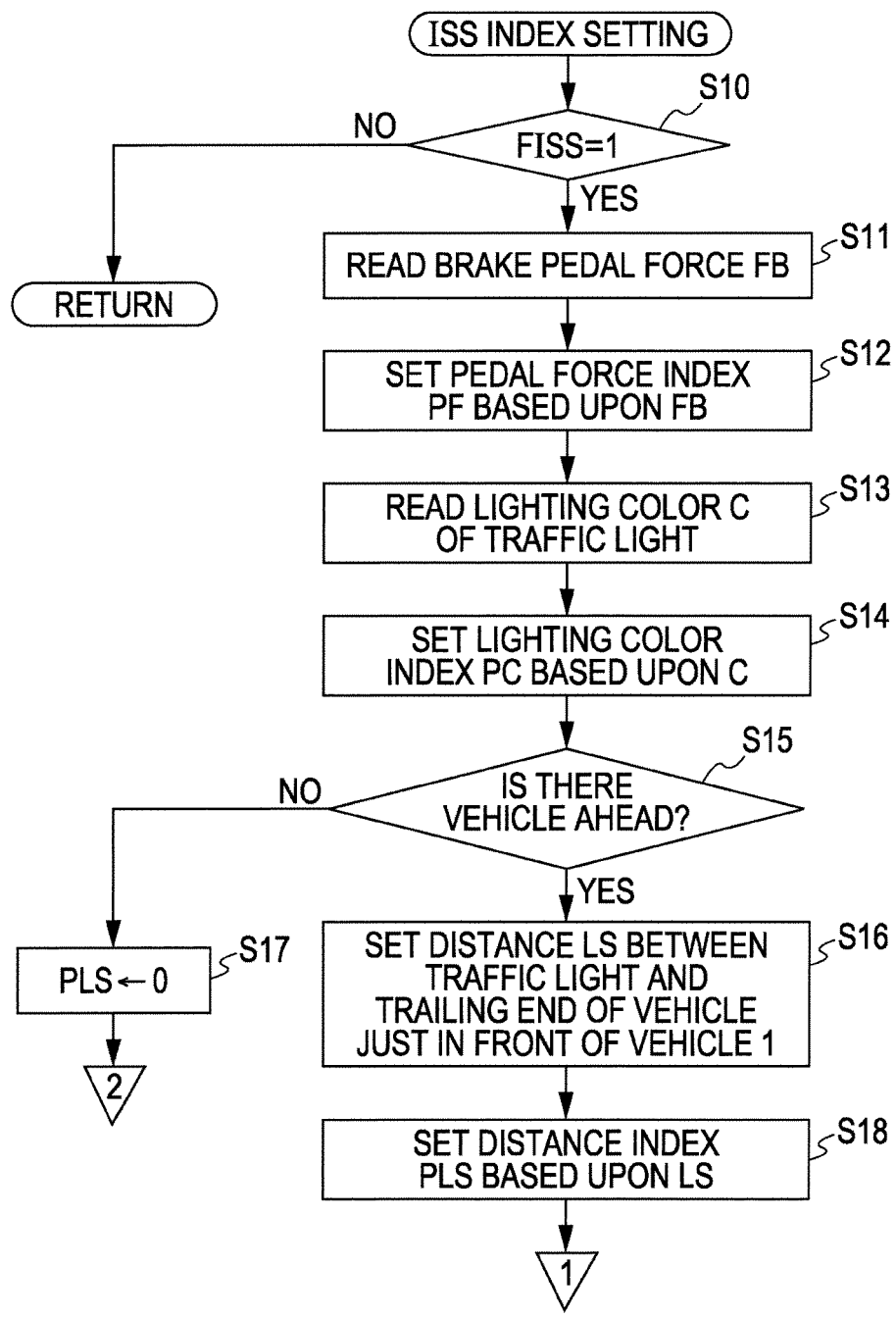
FIG. 4 is a flowchart (1) illustrating an idling-stop index setting routine.
Figure 5:
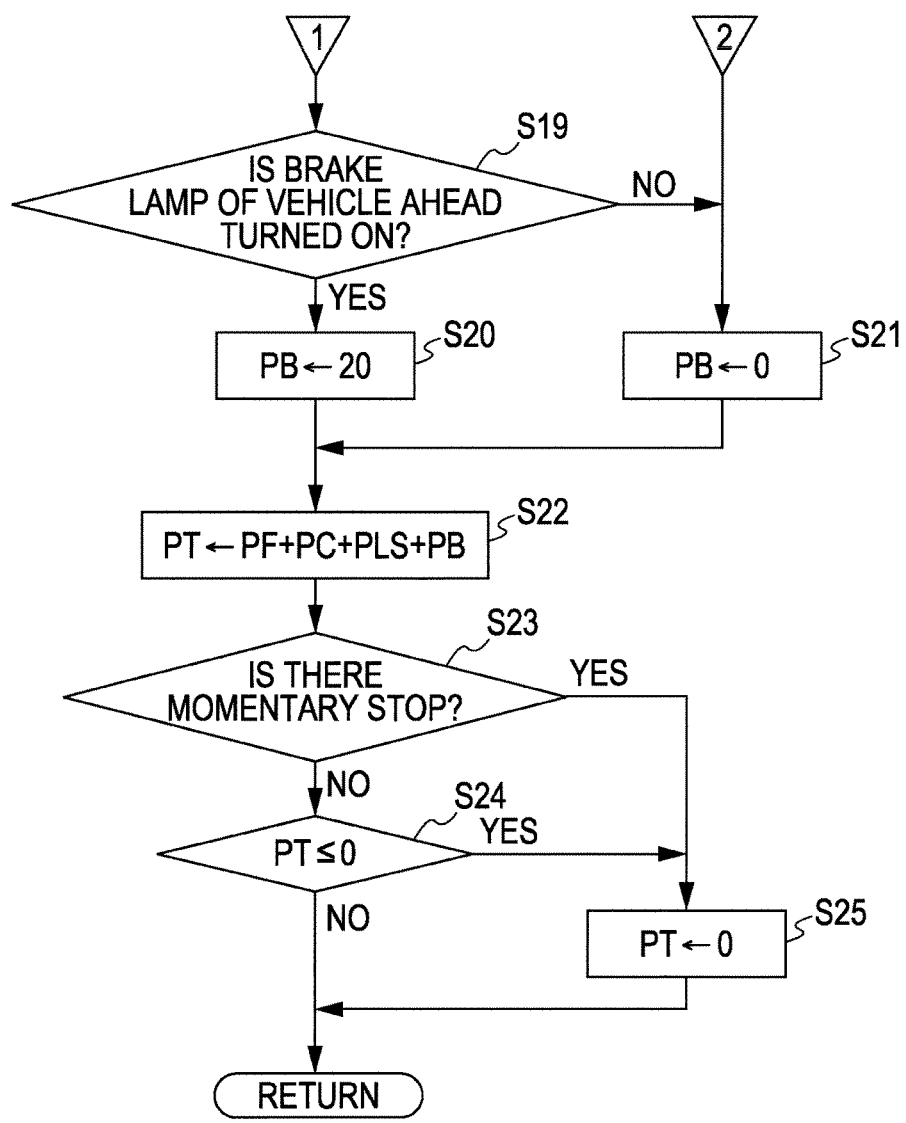
FIG. 5 is a flowchart (2) illustrating the idling-stop index setting routine.

Subsequently, an ISS index setting routine illustrated in FIGS. 4 and 5 is executed in every predetermined operation period. In this routine, the ISS index (point) for setting the vehicle speed for starting the ISS control is obtained based upon the brake pedal force, and the external environment in front of the vehicle 1.

The ECU 5 firstly checks the value of the ISS permitting condition determining flag FISS in step S10. In the case of FISS=0 that means the ISS permitting condition is not satisfied, the ECU 5 exits the routine without any change. In the case of FISS=1 that means the ISS permitting condition is satisfied, the ECU 5 proceeds to step S11.

In step S11, the ECU 5 reads the brake pedal force FB detected by the brake pedal force sensor 10. Then in step S12, the ECU 5 sets a pedal force index PF based upon the brake pedal force FB by referring to a table of an index of the brake pedal force illustrated in FIG. 9A. The pedal force index PF is set to have a larger value, as the brake pedal force FB is large. Specifically, when the brake pedal force FB has a value not less than a high determination value FBH (FE≥FBH), PF is set to be 20, and when the brake pedal force FB has a value between the high determination value FBH and an intermediate determination value FBM (FBH>FB≥FB), PF is set to be 10. When the brake pedal force FB has a value between the intermediate determination value FBM and 0 (brake pedal is not depressed) (FBM>FB>0), PF is set to be 0, and when the brake pedal is not depressed (0≥FB), PF is set to be −50. The pedal force index PF set when the brake pedal is not depressed is set such that the later-described ISS general index PT becomes negative.

Subsequently, the ECU 5 proceeds to step S13 to read a lighting color C of a traffic light 21, which is a factor of deceleration and which is detected based upon the external environment in front of the vehicle 1 captured by the onboard camera 3. Then the ECU 5 sets a lighting color index PC based upon the lighting color C by referring to a table of a lighting color index illustrated in FIG. 9B in step S14. When the onboard camera 3 has a color image device, the ECU 5 determines the lighting color C of the traffic light 21 based upon a color signal. When the onboard camera 3 has a monochrome image device, the ECU 5 determines the lighting color C based upon a luminance difference.

The lighting color index PC is set to have a larger value, as the stop time of the vehicle 1 is expected to be longer based upon the lighting color C. Specifically, when the traffic light 21 is not detected, and the lighting color C is determined to be non-recognized CE (C=CE), or when the lighting color C is recognized as blue (CB) (C=CB), PC is set to be 0. When the lighting color C is recognized as yellow (CY) (C=CY), PC is set to be 50. When the lighting color C is recognized as red (CR) (C=CR), PC is set to be 20.

Thereafter, the ECU 5 proceeds to step S15 to check whether or not there is a vehicle running in front of the vehicle 1 based upon the external environment in front of the vehicle 1 captured by the onboard camera 3. When there is not detected a preceding vehicle ahead of the vehicle 1, the ECU 5 proceeds to step S16. When there is detected a preceding vehicle ahead of the vehicle 1, the ECU 5 proceeds to step S17 to set a distance index PLS to 0 (PLS←0), and then jumps to step S21.

In step S16, the ECU 5 sets a distance LS between the traffic light 21 ahead that is the factor of the deceleration and the trailing end of the vehicle running just in front of the vehicle 1 from the disparity between them based upon the external environment in front of the vehicle 1 captured by the main camera 3a and the sub-camera 3b of the onboard camera 3. Then, the ECU 5 proceeds to step S18 so as to set the distance index PLS based upon the distance LS by referring to a table of the distance index illustrated in FIG. 9C. When the traffic light 21 is recognized, the distance index PLS is set to be larger, as the distance LS is longer.

Specifically, when the traffic light 21 is not recognized, and the distance LS is determined not to be recognized (LS=LE), or when the distance LS is short within a short distance determination value LSS (e.g., 10 [m]) (LS<LSS≤LSM), the ECU 5 sets the distance index PLS to 0 (PLS←0). When the distance LS is determined to be an intermediately short distance between the short distance determination value LSS and an intermediate distance determination value LSM (e.g., 20 [m]) (LSS<LS≤LSM), PS is set to be 10. When the distance LS is determined to be an intermediate distance between the intermediate distance determination value LSM and a long distance determination value LSL (e.g., 20 [m]) (LSM<LS≤LSL), PS is set to be 20, and when the distance LS is determined to be longer than the long distance determination value LSL (LSL<LS), PS is set to be 30.

Thereafter, when proceeding to step S19 from step S18, the ECU 5 checks the lighting state of the brake lamp of the preceding vehicle, which is the deceleration factor, based upon the image captured by the onboard camera 3, and when the ECU 5 determines that the brake lamp is turned on, the ECU 5 proceeds to step S20 to set the brake index PB to 20 (PB←20), and then, proceeds to step S22. When the ECU 5 does not detect that the brake lamp is turned on, the ECU 5 proceeds to step S21. When proceeding to step S21 from step S17 or step S19, the ECU 5 sets the brake index PB to 0 (PB←0), and then, proceeds to step S22.

When proceeding to step S22, the ECU 5 adds up the indices PF, PC, PLS, and PB to calculate the ISS general index PT (PT←PF+PC+PLS+PB). Then, the ECU 5 proceeds to step S23 so as to check whether or not a momentary stop that is the deceleration factor is recognized ahead from the external environment captured by the onboard camera 3. Whether or not the momentary stop is recognized is determined by the determination as to whether or not a momentary stop sign is recognized, or whether or not a stop line before an intersection is recognized, from the external environment captured by the onboard camera 3.

When the ECU 5 determines that the momentary stop is not recognized, it proceeds to step S24, and when determining that the momentary stop is recognized, the ECU 5 jumps to step S25. When proceeding to step S24, the ECU 5 checks whether or not the ISS general index PT is not more than 0. In the case of PT>0, the ECU 5 exits the routine without any change. In the case of PT≤0, the ECU 5 proceeds to step S25. When proceeding to step S25 from step S23 or step S24, the ECU 5 sets the ISS general index PT to 0 (PT←0), and then, exits the routine.

Figure 6:
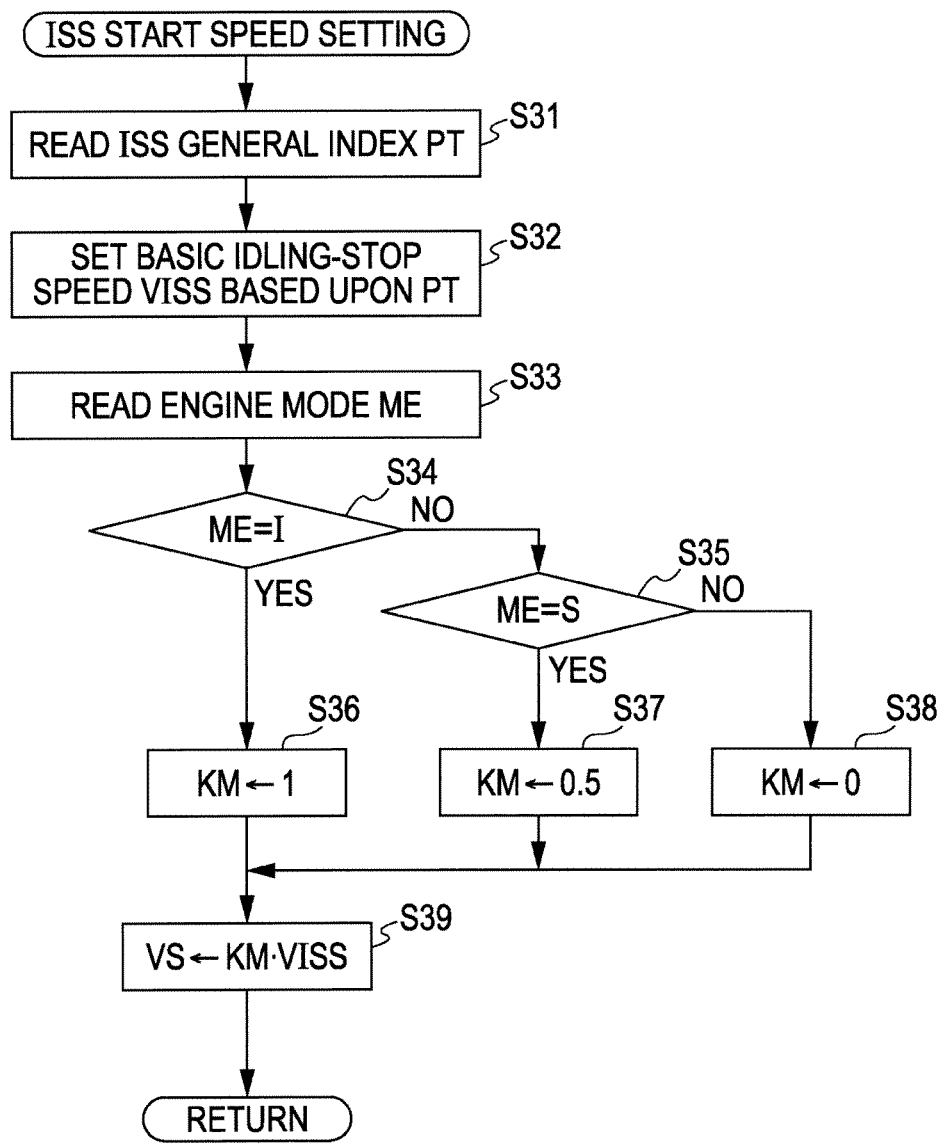
FIG. 6 is a flowchart illustrating an idling-stop start speed setting routine.

The ISS general index PT is read by the ISS start speed setting routine illustrated in FIG. 6. The process in this routine corresponds to the idling-stop start speed setting unit in the present invention.

Figure 10:
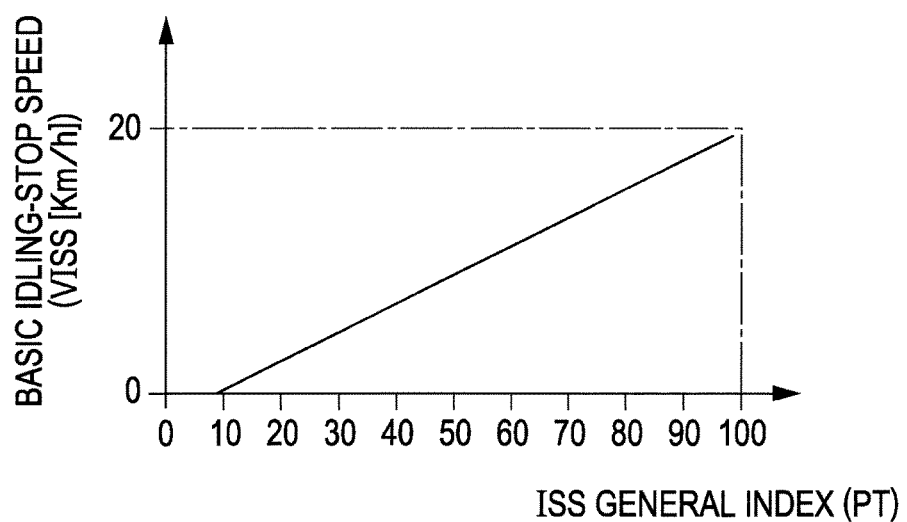
FIG. 10 is an explanatory view of a basic idling-stop start speed table.

This routine is executed at intervals of predetermined operation. Firstly, the ECU 5 reads the ISS general index PT in step S31. Then in next step S32, the ECU 5 sets a basic idling stop (basic ISS) speed VISS based upon the ISS general index PT by referring to a table of the basic ISS speed illustrated in FIG. 10. As illustrated in this figure, in the basic ISS speed table, the relationship between the ISS general index PT and the basic ISS speed VISS [Km/h] is set in the form of a proportional relation with almost a predetermined slope. Accordingly, the basic ISS speed VISS can be obtained from an arithmetic expression based upon the ISS general index PT. The intercept of the slope is set on the position where the ISS general index PT is 10 in FIG. 10. Therefore, in this figure, when the ISS general index PT is not more than 10, the basic ISS speed VISS is set to 0.

Then, the ECU 5 reads the current engine mode ME in step S33. The driver can select the engine mode ME from any one of the normal mode S suitable for the normal driving, the echo-mode I suitable for the economical driving, and the power mode S# focusing on power, by operating the mode switch 8.

The ECU 5 determines which mode is selected for the engine mode ME in steps S34 and S35. In the case of the echo-mode I, the ECU 5 proceeds to step S36 from step S34; in the case of the normal mode S, it proceeds to step S37 from step S35; and in the case of the power mode S#, it proceeds to step S38 from step S35.

When proceeding to step S36, the ECU 5 sets a mode-based coefficient KM to 1 (KM←1), and then, proceeds to step S39. When proceeding to step S37, the ECU 5 sets the mode-based coefficient KM to 0.5 (KM←0.5), and then, proceeds to step S39. When proceeding to step S38, the ECU 5 sets the mode-based coefficient KM to 0 (KM←0), and then, proceeds to step S39.

When proceeding to step S39, the ECU 5 sets the ISS start speed VS by multiplying the basic ISS speed VISS by the mode-based coefficient KM (VS←KM·VISS). As a result, the ISS start speed VS is set according to the engine mode ME selected by the driver. Specifically, when the echo-mode I is selected, the ISS start speed VS is set to be the largest speed; when the normal mode S is selected, the ISS start speed VS is set to be half the value in the echo-mode I; and when the power mode S# is selected, the ISS start speed VS is set to 0, so that the early ISS control is canceled.

Figure 7:
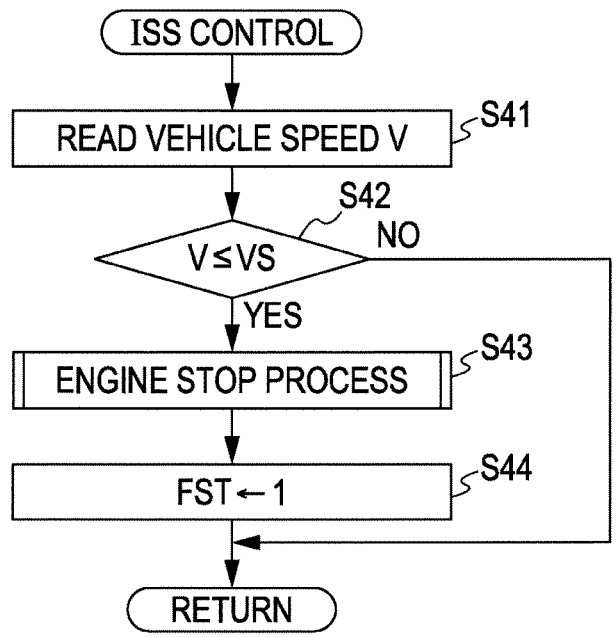
FIG. 7 is a flowchart illustrating an idling-stop control routine.

The ISS start speed VS is read in the ISS control routine illustrated in FIG. 7. This routine is executed in every predetermined operation period. Firstly, the ECU 5 reads the current vehicle speed V in step S41, and compares the vehicle speed V and the ISS start speed VS in next step S42.

When the vehicle speed V is higher than the ISS start speed VS (V>≥VS), the ECU 5 exits the routine without any change. On the other hand, when the vehicle speed V decreases to a value not more than the ISS start speed VS (V≤VS), the ECU 5 proceeds to step S43 to execute an engine stop process.

In the present embodiment, as the engine stop process, the fuel cut signal is output to the injector 2a of the engine 2, and the ignition cut signal is output to the igniter 4. Then, the engine 2 is stopped by cutting the fuel and by cutting the ignition. The engine 2 may be stopped only by cutting the fuel.

Thereafter, the ECU 5 proceeds to step S44 to set the ISS start flag FST (FST←1), and then, exits the routine.

Figure 8:
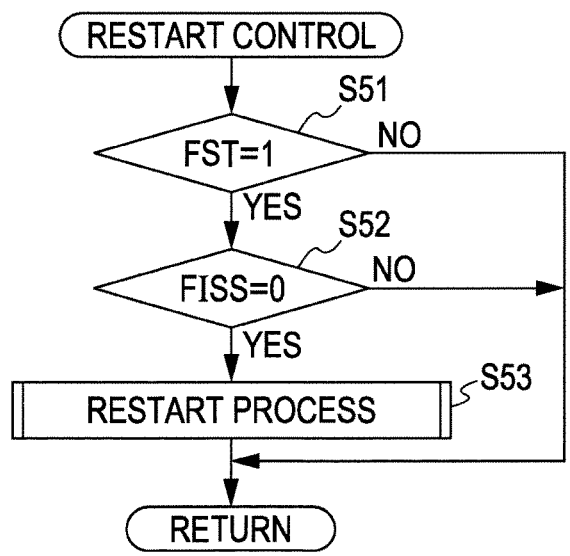
FIG. 8 is a flowchart illustrating a restart control routine.

The ISS start flag FST is read in the restart control routine illustrated in FIG. 8. This routine is executed in every predetermined operation period. Firstly, the ECU 5 checks the value of the ISS start flag FST in step S51, and during the idling stop satisfying FST=1, it proceeds to step S52. While the engine is operated (FST=0), the ECU 5 exits the routine without any change.

When proceeding to step S52, the ECU 5 checks the value of the ISS permitting condition determination flag FISS. When the situation is changed from the case in which the ISS control condition is established (FISS=1) to the case in which the same condition is not established (FISS=0), the ECU 5 proceeds to step S53. When the situation in which the ISS control condition is satisfied (FISS=1) is continued, the ECU 5 exits the routine without any change.

When proceeding to step S53, the ECU 5 executes a restart process, i.e., automatically operates a starter motor and the like, thereby restarting the engine 2. Then, the ECU 5 exits the routine.

Figure 11:
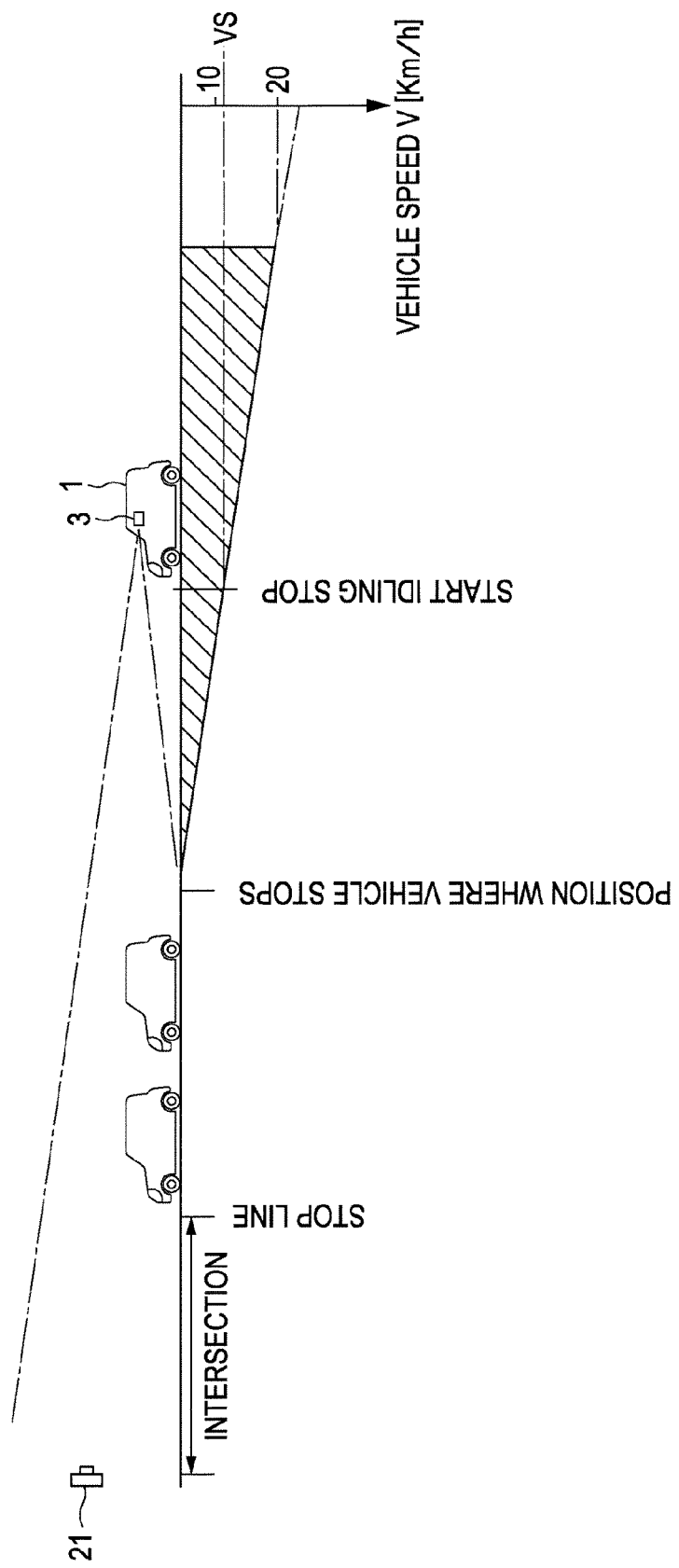
FIG. 11 is an explanatory view illustrating an idling stop control state.

As a result, as illustrated in FIG. 11, when the speed V of the vehicle 1 is reduced to the ISS start speed VS, the ISS control is automatically executed to stop the engine 2. The ISS start speed VS is variably set according to different external environment elements. For example, when the lighting color C of the traffic light 21 is blue (CB), the ISS start speed VS is set to have a low speed, compared to the case of yellow (CY) or red (CR), whereby the vehicle 1 can respond to the reacceleration after the speed reduction, compared to the conventional case in which the idling-stop start speed is uniformly set. Consequently, the ISS start speed VS is set at the optimum timing according to the external environment, thereby enhancing the fuel economy and drivability.

The present invention is not limited to the above-mentioned embodiment. For example, when inter-vehicle communication is possible between the preceding vehicle and the vehicle 1, the condition of the preceding vehicle on the intersection may be obtained from position information and speed thereof acquired by the inter-vehicle communication. Alternatively, when information of a traffic light on an intersection, or information of a preceding vehicle approaching the intersection can be acquired by vehicle-roadside communication, various indices may be set based upon the information acquired by the vehicle-roadside communication.

The invention claimed is:

1. An idling stop device for a vehicle, comprising:
an external environment recognition unit for recognizing external environment of the vehicle, including a traffic signal, a preceding vehicle immediately in front of the vehicle, road signs, and road markings; and
a controller configured to:
detect deceleration factors in front of the vehicle based on the recognized external environment, including a distance between a recognized traffic signal and a recognized preceding vehicle immediately in front of the vehicle, a lighting color of the recognized traffic signal, and a lighting state of a brake lamp of the recognized preceding vehicle;
calculate an idling stop index based on index values corresponding to the detected deceleration factors, which is a factor to determine an idling-stop start speed at which an idling stop starts;
determine whether the external environment recognition unit recognizes one or more of a stop sign and a stop line before an intersection;
reset the idling stop index below a predetermined value when it is determined that the external environment recognition unit recognizes one or more of a stop sign and a stop line before an intersection;
when the idling stop index is greater than the predetermined value, set the idling-stop start speed based upon the idling stop index; and
stop an engine when a speed of the vehicle is reduced to a speed lower than the idling-stop start speed.

2. The idling stop device according to claim 1, further comprising:
a brake pedal force detecting unit for detecting a force on a brake pedal mounted to the vehicle, wherein the idling-stop start speed setting unit sets the idling-stop start speed based upon at least the brake pedal force detected by the brake pedal force detecting unit.

3. The idling stop device according to claim 1, further comprising:
a brake pedal force detecting unit for detecting a force on a brake pedal mounted to the vehicle, wherein the idling-stop start speed setting unit sets the idling-stop start speed based upon at least the brake pedal force detected by the brake pedal force detecting unit.

4. The idling stop device according to any one of claim 1, wherein the engine mounted to the vehicle has plural engine modes, each having a different output characteristic, and when an engine mode focusing on power is selected, the idling-stop start speed is canceled.

5. The idling stop device according to any one of claim 1, wherein the engine mounted to the vehicle has plural engine modes, each having a different output characteristic, and when an engine mode focusing on power is selected, the idling-stop start speed is canceled.

6. The idling stop device according to any one of claim 1, wherein the external environment recognition unit is an onboard camera including a main camera and a sub-camera.

* * * * *